(12) United States Patent
Matuszny et al.

(10) Patent No.: US 10,782,209 B2
(45) Date of Patent: Sep. 22, 2020

(54) TIRE UNIFORMITY TESTING MACHINE AND A LOAD WHEEL CARRIAGE ASSEMBLY FOR A TIRE UNIFORMITY MACHINE

(71) Applicant: MICRO-POISE MEASUREMENT SYSTEMS, LLC, Streetsboro, OH (US)

(72) Inventors: Richard Matuszny, Strongsville, OH (US); Alex Anton Femec, Kent, OH (US); Rich Krieger, Pitesti (RO); John C. Ryder, Chippewa Lake, OH (US)

(73) Assignee: MICRO-POISE MEASUREMENT SYSTEMS LLC, Streetsboro, OH (US)

(*) Notice: Subject to any disclaimer, the term of this patent is extended or adjusted under 35 U.S.C. 154(b) by 449 days.

(21) Appl. No.: 15/529,245

(22) PCT Filed: Dec. 2, 2015

(86) PCT No.: PCT/US2015/063407
§ 371 (c)(1),
(2) Date: May 24, 2017

(87) PCT Pub. No.: WO2016/089983
PCT Pub. Date: Jun. 9, 2016

(65) Prior Publication Data
US 2017/0363516 A1    Dec. 21, 2017

Related U.S. Application Data

(60) Provisional application No. 62/086,288, filed on Dec. 2, 2014.

(51) Int. Cl.
*G01M 17/02*    (2006.01)
*B29D 30/00*    (2006.01)

(52) U.S. Cl.
CPC ....... *G01M 17/022* (2013.01); *B29D 30/0061* (2013.01); *B29D 2030/0066* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 4,458,451 A * 7/1984 Rogers .................... B24B 5/366
                                                                 451/1
4,856,324 A    8/1989 Potts
(Continued)

FOREIGN PATENT DOCUMENTS

CN    1243478 A    2/2000
CN    1510408 A    7/2004
(Continued)

OTHER PUBLICATIONS

Extended European Search Report—EP 15 86 5812—completed Feb. 6, 2019.
(Continued)

*Primary Examiner* — Andre J Allen
(74) *Attorney, Agent, or Firm* — Tarolli, Sundheim, Covell & Tummino LLP (57) ABSTRACT

A tire uniformity testing machine that includes a base, a pair of vertical spaced apart columns supporting an upper cross frame member. The base carries a load wheel carriage movable towards and away from a testing station. The vertical uprights establish a peripheral footprint plane that does not extend beyond a plane that is tangent to an outer rolling surface of the load wheel when it is redirected. The upper frame member includes clearance spaces and cutouts that enable at least a portion of an upper chuck to move into the upper frame member and a super structure mounted to a (Continued)

top of the cross member that mounts at least a portion of an actuator for translating the upper chuck. The configuration establishes a machine height that enables the machine to be loaded into a standard shipping container and reduces the overall footprint of the tire uniformity machine without compromising its ability to precisely sense tire uniformity parameters.

12 Claims, 11 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0496; B60C 23/0408; B60C 23/041; B60C 23/0411; B60C 23/0488; B60C 23/20; B60C 11/243; B60C 11/246; B60C 23/06; B60C 23/0486; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 5,111,687 A | 5/1992 | Hill | |
| 5,390,540 A | 2/1995 | Mallison | |
| 5,979,231 A | 11/1999 | Lees, Sr. et al. | |
| 6,089,084 A * | 7/2000 | Nishihara | G01M 17/021 73/146 |
| 6,131,455 A | 10/2000 | Matsumoto et al. | |
| 6,584,877 B1 * | 7/2003 | Poling, Sr. | G01M 17/022 82/101 |
| 6,834,559 B1 | 12/2004 | Beebe | |
| 2010/0064789 A1 * | 3/2010 | Schraudolf | G01M 17/022 73/146 |
| 2014/0260583 A1 * | 9/2014 | Vernyi | G01M 17/021 73/146 |
| 2017/0115187 A1 * | 4/2017 | Symens | G01M 17/021 |

FOREIGN PATENT DOCUMENTS

| | | |
|---|---|---|
| CN | 101603883 | 12/2009 |
| CN | 101975666 A | 2/2011 |
| CN | 102105775 A | 6/2011 |
| CN | 202049054 | 11/2011 |
| CN | 1813180 B | 8/2013 |
| DE | 197 31 486 | 1/1999 |
| EP | 1126267 A2 | 8/2001 |
| WO | 1998035844 | 8/1998 |

OTHER PUBLICATIONS

PCT/US15/63407 International Search Report & Written Opinion, completed Mar. 31, 2016.

* cited by examiner

TIRE UNIFORMITY TESTING MACHINE AND A LOAD WHEEL CARRIAGE ASSEMBLY FOR A TIRE UNIFORMITY MACHINE

CROSS REFERENCES TO RELATED APPLICATIONS

This application filed under 35 U.S.C § 371 is a national phase application of International Application Serial Number PCT/US2015/063407 filed Dec. 2, 2015, which claims priority to U.S. Provisional Application 62/086,288, filed Dec. 2, 2014.

RELATED APPLICATIONS

This application claims priority from U.S. Provisional Application No. 62/086,288, filed Dec. 2, 2014, the entirety of which is incorporated herein by reference.

TECHNICAL FIELD

The present invention relates generally to tire uniformity testing and, in particular, to a tire uniformity testing machine with a compact footprint and which can be easily shipped in a standard shipping container.

BACKGROUND ART

Many, if not most, tire manufacturing facilities, in addition to tire making equipment, also have tire uniformity testing machines for testing and/or grading tires that have been manufactured. An example of such a machine is disclosed in U.S. Pat. No. 6,016,695. These types of machines are very complex and include many components, including a tire testing station and a load wheel that contacts the tire during a testing cycle and applies a predetermined force to the tire. Sensors, usually in the form of load cells that support the load wheel sense tire uniformity parameters in the tire being tested. This information can be used to grade the tire, pass the tire as having met manufacturing requirements or reject the tire as failing to meet the requirements. In order to perform the tire uniformity test, the components must be rigidly attached to a frame structure so that the forces generated during the testing cycle do not cause excessive movement, vibration, etc. in the testing components. As a consequence, many prior art tire uniformity testing machines, such as the one disclosed in the above-mentioned patent, occupy significant floor space in the manufacturing facility. In many facilities, floor space is at a premium and, as a result, there is a need for tire uniformity testing machines having a reduced or smaller footprint.

DISCLOSURE OF THE INVENTION

The present invention provides a new and improved tire uniformity testing machine that occupies a smaller footprint in the manufacturing facility as contrasted to prior art machines without compromising its ability to precisely measure tire uniformity parameters in a tire being tested.

According to one embodiment of the invention, the tire uniformity testing machine includes a base, an upper cross frame member spaced above the base and vertical support structure extending upwardly from at least one end of the base versus supporting at least one end of the upper cross frame member. According to the invention, a pair of spaced apart vertical columns extend upwardly from another end of the base and support another end of the upper cross frame member.

The base defines a tire testing position at which a tire to be tested is rotatably mounted. A load wheel carriage at least partially supported by the base includes a rotatable load wheel that is movable towards and away from the tire testing station along a transverse line of action. The load wheel defines a rolling surface engageable with a periphery of a tire to be tested and the load wheel and tire are rotatable about a pair of parallel, substantially vertical axes such that the transverse line of action passes through the axes of rotation. According to the invention, the upwardly extending spaced apart columns are located such that a peripheral portion of the load wheel is located between the support and the supports define an outer footprint plane that is not substantially outside a plane tangent to an outside portion of the rolling surface of the load wheel and that is orthogonal to the line of action.

According to a further feature of the invention, a load wheel carriage assembly is disclosed that includes a pair of spaced apart vertical supports and upper and lower, vertically spaced apart cross pieces that are supported by the vertical supports. Upper and lower load cells are mounted to the upper and lower cross pieces, respectively, between which a load wheel is rotatably supported. The load wheel rolling surface engages a periphery of a tire to be tested when the carriage assembly is moved into a tire testing position. According to a feature of this embodiment of the load carriage assembly, the load wheel includes a portion nested between the vertical columns. At least one actuator moves the carriage towards and away from the tire testing position.

According to a feature of this embodiment, the vertical supports of the load wheel carriage are triangular in cross section, such that a hypotenuse of the triangular cross section confronts the rolling surface of the load wheel. According to this embodiment, the triangular vertical supports, the upper and lower vertical spaced apart cross pieces, as well as other structure are configured to substantially rigidize the carriage assembly frame so that a bending moment generated when the load wheel is in contact with the tire being tested, is substantially resisted. As a result, deflections in the load wheel mounting are substantially inhibited, which would otherwise cause imprecise measurements. In the preferred embodiment, the load wheel actuator is located below the load wheel, rather than aligned with a center radial plane of the load wheel and, as a result, the carriage frame, as indicated above, is configured to be substantially rigid since, in the preferred embodiment, the actuator and associated drive components are not in a position to resist the bending moment applied to the load wheel carriage during testing of a tire.

According to a further feature of the invention, the base, vertical columns and the upper cross frame member are configured such that the machine defines a height dimension that can fit within a standard shipping container.

According to another feature of the invention, the tire uniformity testing machine includes an upper chuck assembly movable towards and away from the tire testing position. According to this feature, the upper cross frame member includes clearance spaces and openings which enable at least a portion of the upper chuck assembly to be received within the upper cross frame member when the upper chuck assembly is retracted. A super structure is secured to the top of the upper cross frame member that at least partially supports an actuator for moving the upper chuck assembly towards and away from the tire testing position.

With this disclosed feature, the overall height of the tire uniformity machine as measured from the bottom of the base and the top of upper cross frame member can be configured to be equal to or less than the height dimension of a standard shipping container, i.e., 96 inches, so that the tire uniformity machine can be loaded into a standard shipping container after the super structure and other associated components are removed. This facilitates shipping of the disclosed tire uniformity machine and substantially reduces shipping costs and the need for extensive reassembly at the customer's location.

According to a feature of another embodiment of the load wheel carriage assembly, a carriage assembly is disclosed that engages a track way mounted to the base, the track way supporting linear motion of the carriage towards and away from the tire testing position. According to this feature, a linkage arrangement is provided that couples the spaced apart vertical supports to the track way so that a bending moment in the vertical supports that is generated during a testing cycle, is resisted.

According to another feature of the invention, the tire testing machine includes a human control module for controlling the testing machines. The control module that is carried by a pendant does not require removal in order to ship the machine. In particular, the pendant includes at least one arm segment pivotally connected to a mounting plate. The mounting plate is slidably attached to one end of the upper cross frame member until it is locked with locking fasteners. According to the invention, the pendant arm can be raised to a position where it is raised above a top surface of the upper cross frame member. If the pendant arm was permanently attached in this way, the ability to ship the tire uniformity machine in a standard shipping container could only be effected by removing the top of the pendant arm. With the disclosed invention, for shipping purposes, the mounting plate can be slid downwardly by releasing the locking fasteners so that the pendant arm is below the top surface of the upper cross frame member, and, therefore, does not impede the ability to ship the tire uniformity machine in a standard shipping container. To achieve this feature, the mounting plate includes vertical slots which allow the mounting plate to move vertically from an upper, operative position, to a lower shipping position.

With the disclosed invention, a tire uniformity testing machine with a smaller footprint is provided so that the machine occupies less space on the manufacturer's floor, as compared to prior art devices. This reduction in footprint does not compromise the machine's ability to precisely measure tire uniformity parameters in a tire being tested.

Additional features of the invention will become apparent and a fuller understanding obtained by reading the following detailed description made in connection with the accompanying drawings.

DESCRIPTION OF THE PREFERRED EMBODIMENT

Figure 1:
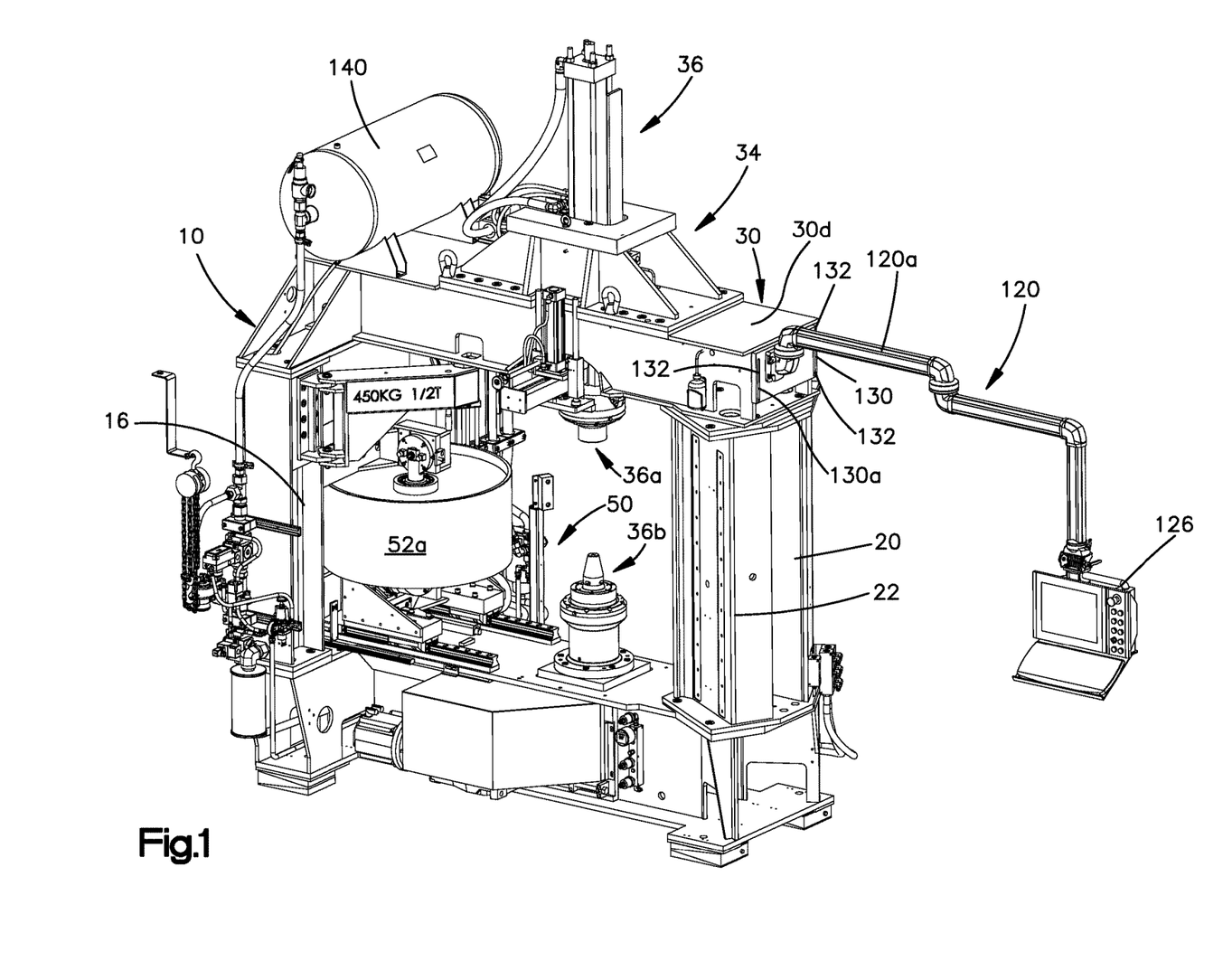
FIG. 1 is a perspective view of a FIG. 1 is a perspective view of a tire uniformity testing system constructed in accordance with a preferred embodiment of the invention.
Figure 2:
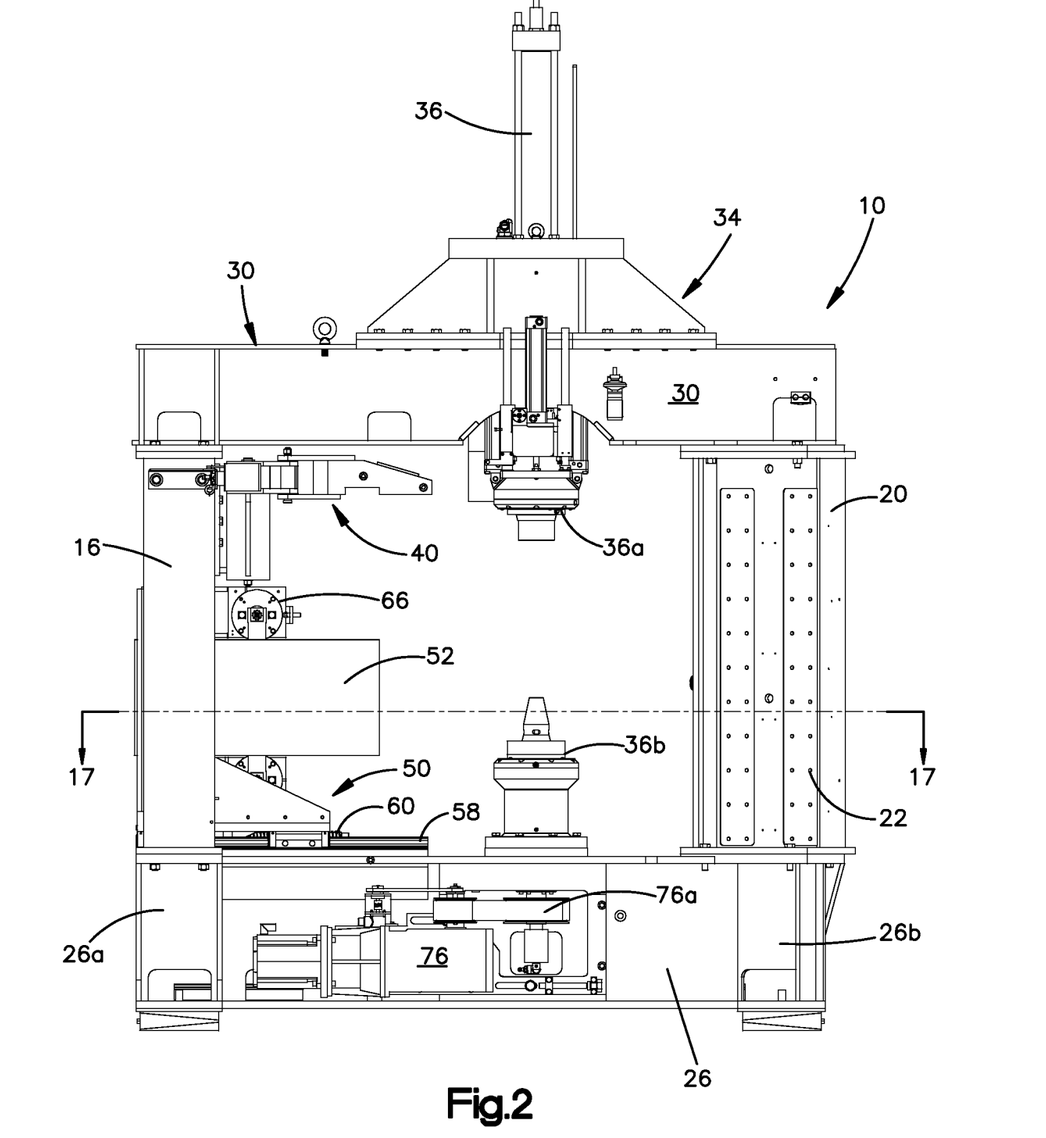
FIG. 2 is a front elevational view of the system shown in FIG. 1.
Figure 3:
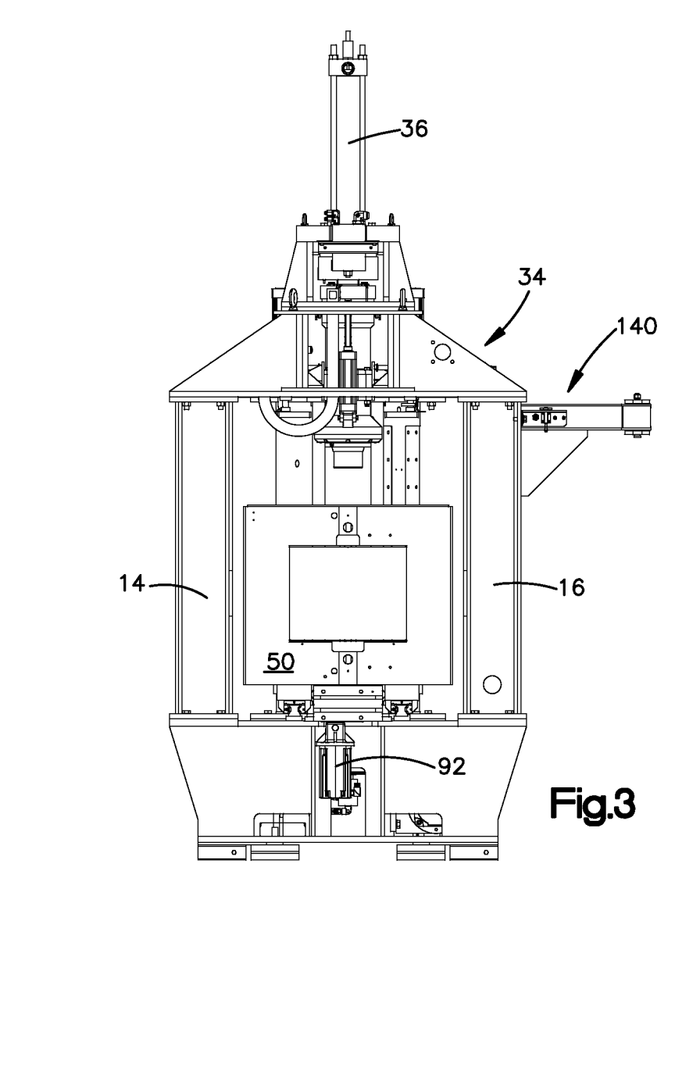
FIG. 3 is side elevational view of the system.
Figure 4:
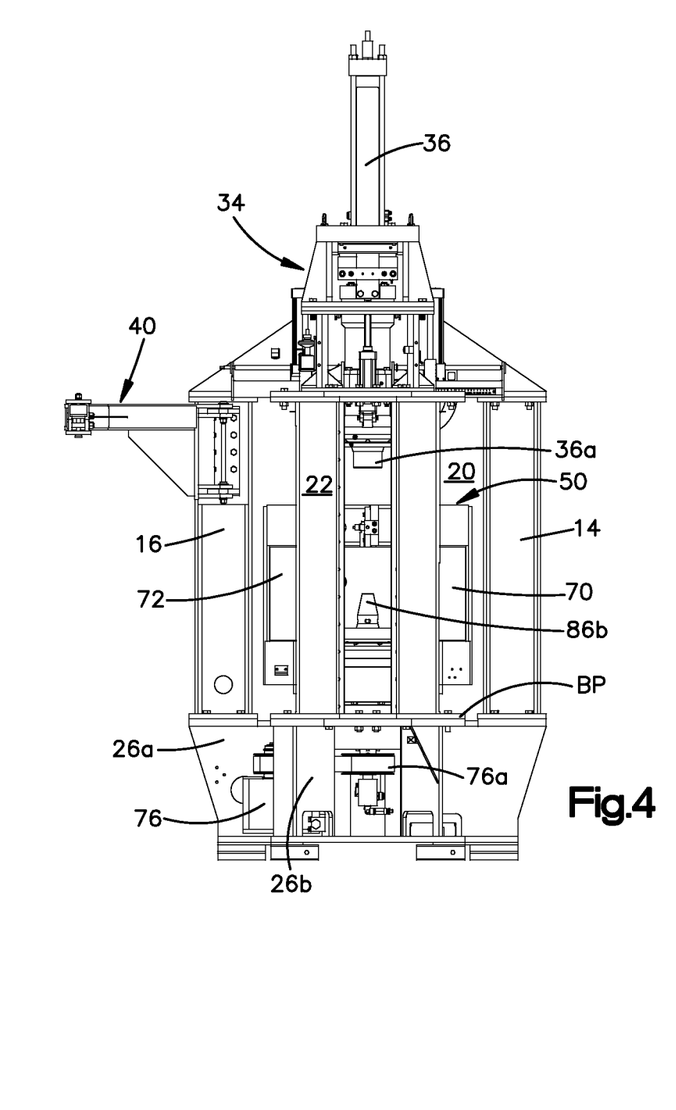
FIG. 4 is a right side elevational view of the system.
Figures 17, 18A, 18B:
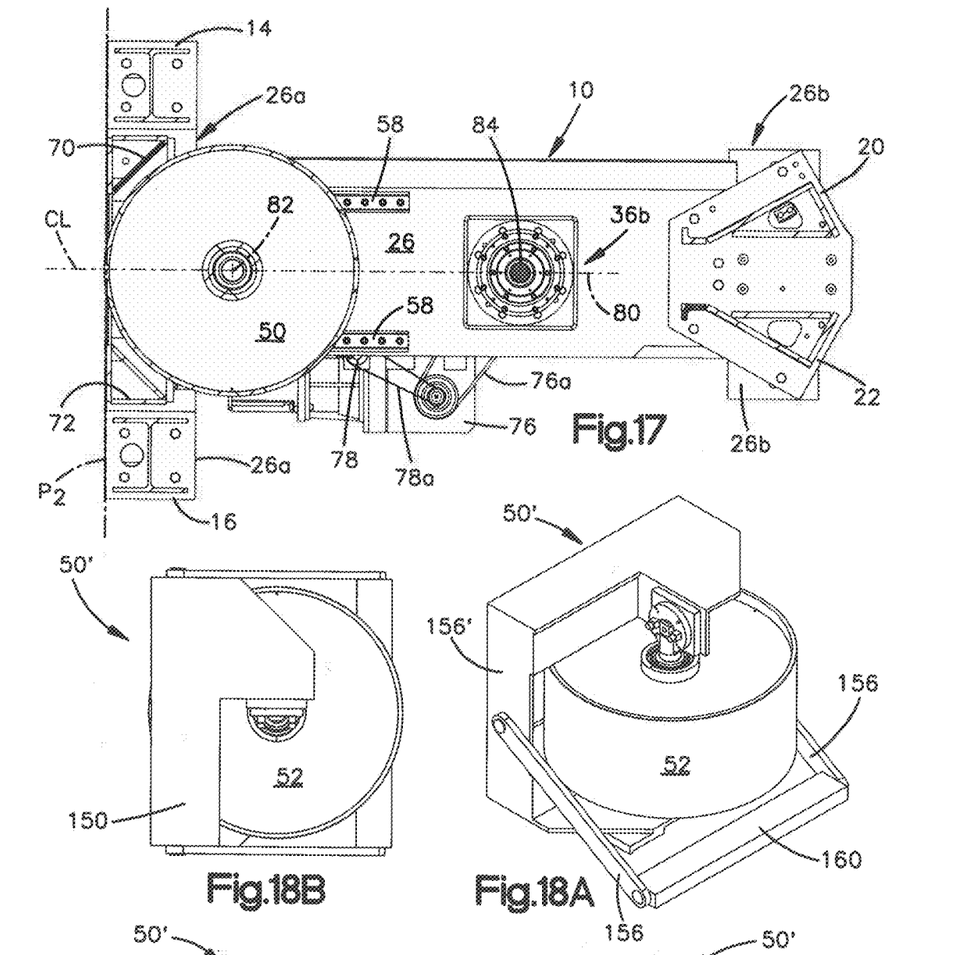
FIG. 17 is a sectional view of the tire testing system as seen from the plane indicated by the line 17-17 in FIG. 5.
FIGS. 18A-18D illustrate the construction of an alternate load wheel carriage.
Figure 18C:
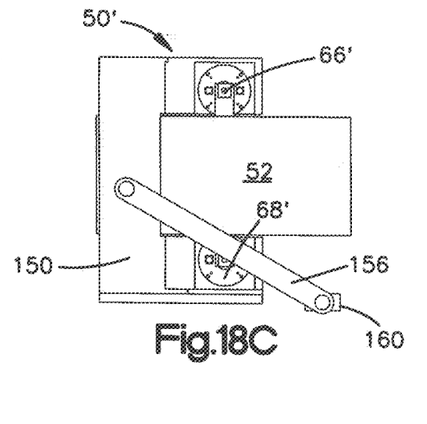
Figure 18D:
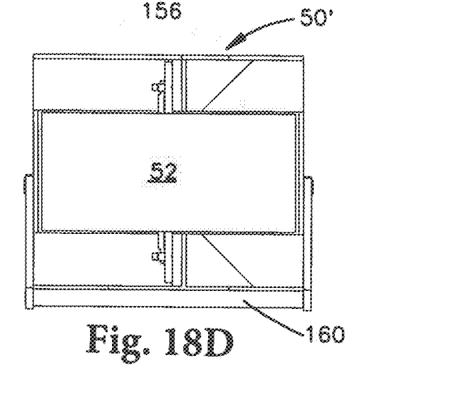

FIG. 1 illustrates the overall construction of a tire uniformity testing system constructed in accordance with a preferred embodiment of the invention. The illustrated apparatus is an improvement to the tire uniformity testing system disclosed in U.S. Pat. No. 6,016,695 which is hereby incorporated by reference. Referring also to FIGS. 2-4, the improved tire uniformity testing system includes a frame structure indicated generally by the reference character 10. Referring also to FIG. 17, which is a sectional view of the tire testing machine as seen from the plane indicated by the line 17-17 in FIG. 2, details of the frame are shown. The frame 10 includes a pair of spaced apart uprights 14-16 on one side of the frame and a pair of angled uprights 20, 22 on the opposite side of the frame. The frame 10 includes a base 26 that includes as crosspiece 26a on the right side as viewed in FIG. 17 to which the uprights 14, 16 are rigidly attached. A relatively short cross piece 26b is located on the left side of the base 26 and includes a base plate BP to which the uprights 20, 22 are rigidly attached.

Figure 14:
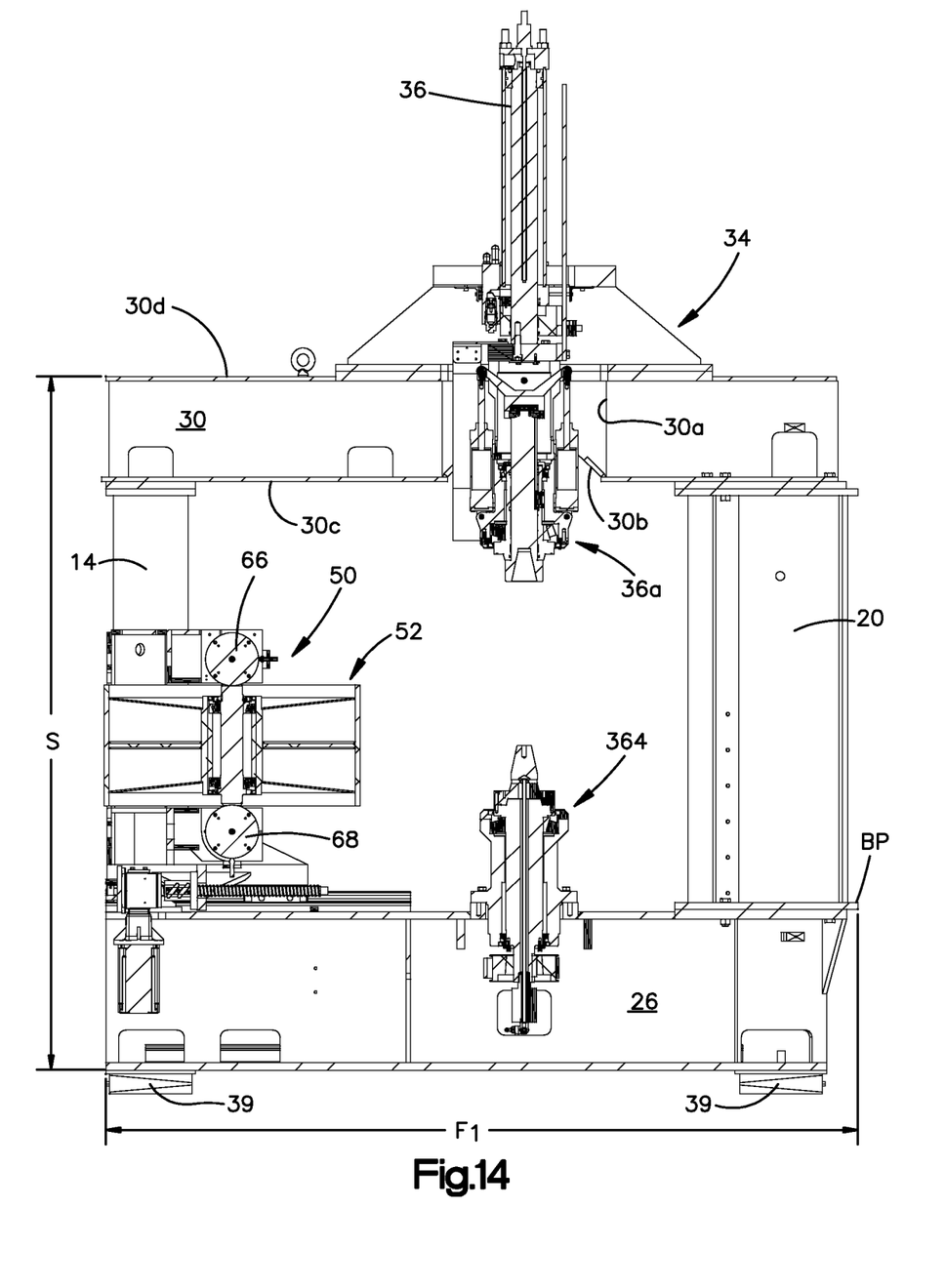
FIG. 14 is a sectional view of the tire testing system as seen from the plane indicated by the line 14-14 in FIG. 6.
Figure 15:
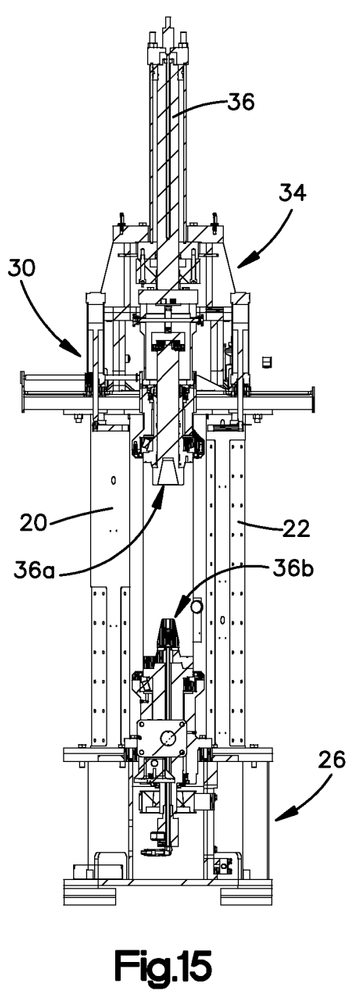
FIG. 15 is a sectional view of the tire testing system as seen from a plane indicated by the line 15-15 in FIG. 6.
Figure 16:
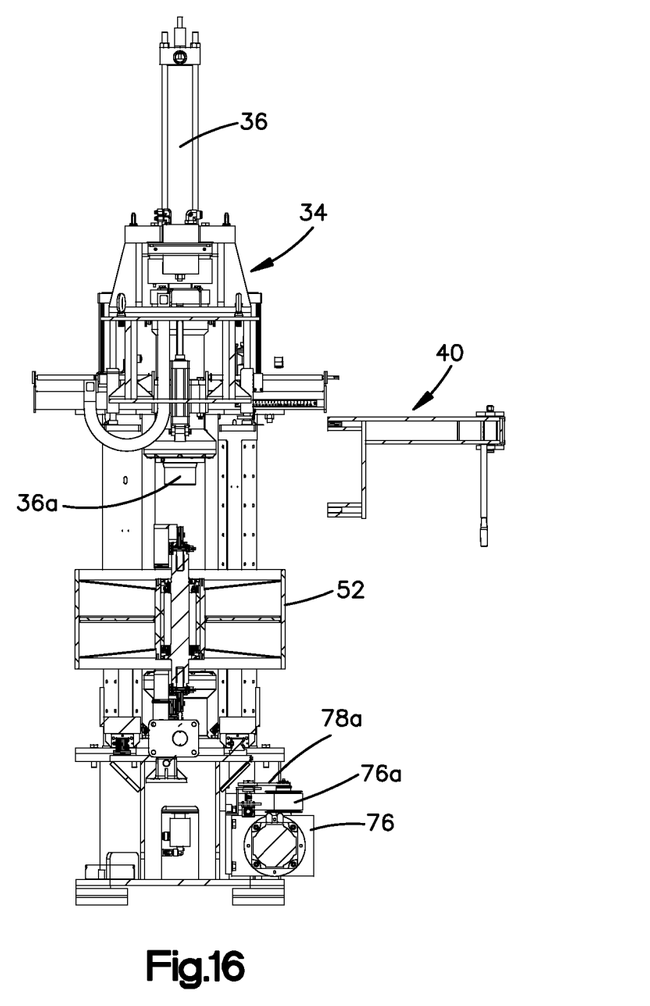
FIG. 16 is a sectional view of the tire testing system as seen from a plane indicated by the line 16-16 in FIG. 6.

A horizontal frame member 30 similar in configuration to the base 26 is attached to the tops of the columns 14, 16, 20 and 22. The horizontal frame member 30 removably mounts a super structure 34 which mounts a linear actuator 36 which is operative to move an upper portion 36a of an adjustable width chuck towards and away from a spindle assembly 36b which is mounted to the base member 26. The upper portion 36a of the chuck and the spindle portion 36b mount half rims which are used to clamp a tire during a testing cycle. The adjustable width chuck is substantially similar to the chuck disclosed in U.S. Pat. No. 5,992,227 which is hereby incorporated by reference. Referring to FIG. 14, an important feature of the invention is shown in detail. In particular, the horizontal frame member 30 includes a clearance opening 30a and cutout 30b. This frame member configuration, allows at least a portion of the upper chuck 36a to move into the horizontal frame member 30 when fully retracted. In conjunction with this feature, the super structure 34 mounts the chuck actuating cylinder 36 and is mounted above the top surface 30d of the frame member 30. In a prior art arrangement, the chuck actuation cylinder would be mounted to the horizontal frame member and the upper chuck portion 36a would be raised until its upper end abuts the lower flange 30c. As a result, the horizontal frame member in prior designs must be mounted substantially higher than the frame member 30 shown in FIG. 14 so that the full range of motion of the upper chuck portion 36a can be accommodated. With the disclosed arrangement shown in FIG. 14, the vertical dimension between the base of the machine and the top surface 30d of the horizontal cross member is reduced. If the height dimension indicated by the reference character "S" is less than or equal to 96 inches, the machine can be loaded into a standard shipping container once the super structure 24 and associated components are unbolted and removed from the horizontal cross member 30. This facilitates shipping of the disclosed tire uniformity machine and reduces overall shipping costs. It should be noted that the height dimension S does not include leveling pads 39 that may be used at the customer's site to level the machine.

Figure 6:
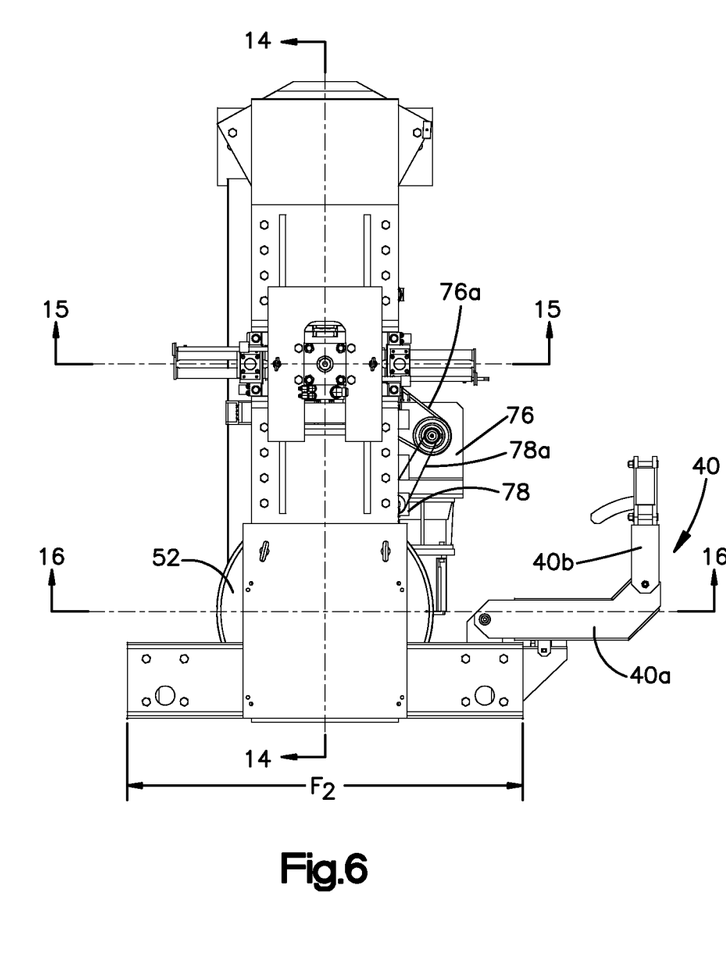
FIG. 6 is a top plan view of the system with parts removed to show details.

The upright column 16 mounts a jib crane 40 which, as seen in FIG. 6, includes segments 40a and 40b which are pivotally attached to each other to allow articulation of the arm elements. The arm element 40a is pivotally attached to the column 16. The attachment of the jib crane 40 to the frame is best shown in FIG. 4.

Figure 5:
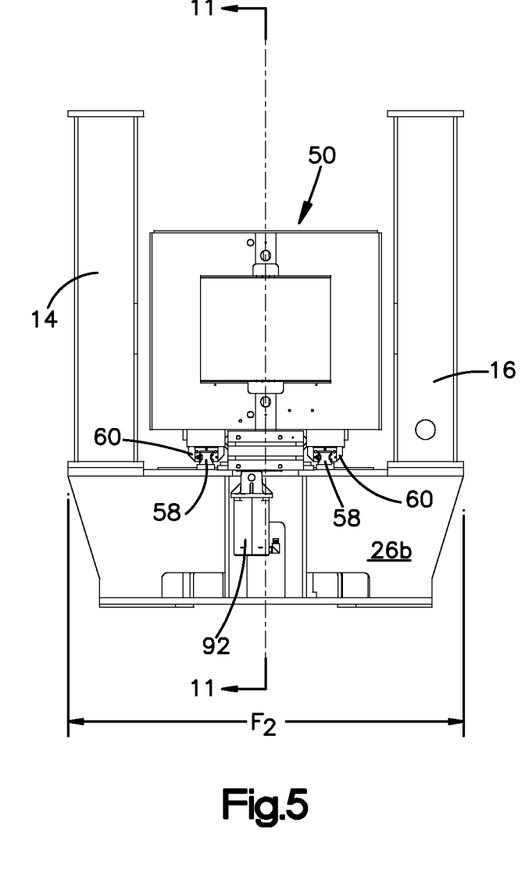
FIG. 5 is a fragmentary view of the system shown in FIG. 1.
Figure 7:
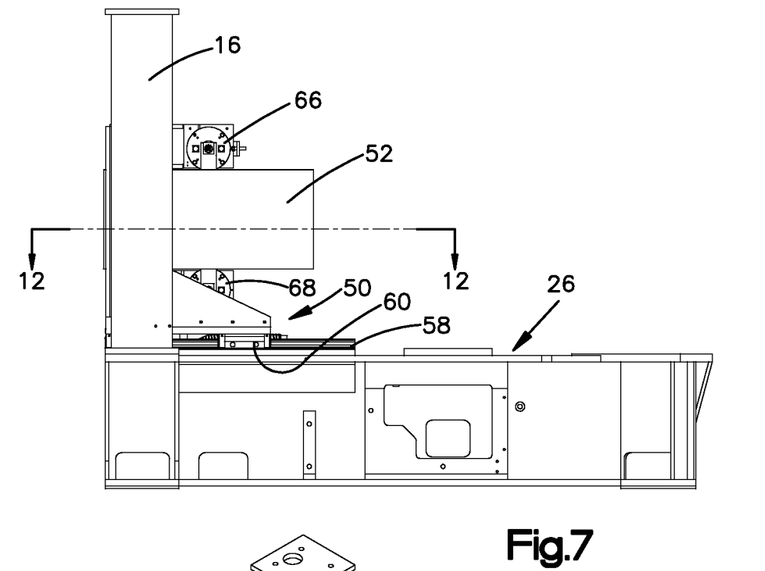
FIG. 7 is a fragmentary view of the system showing details of a load wheel carriage constructed in accordance with a preferred embodiment of the invention.
Figure 8:
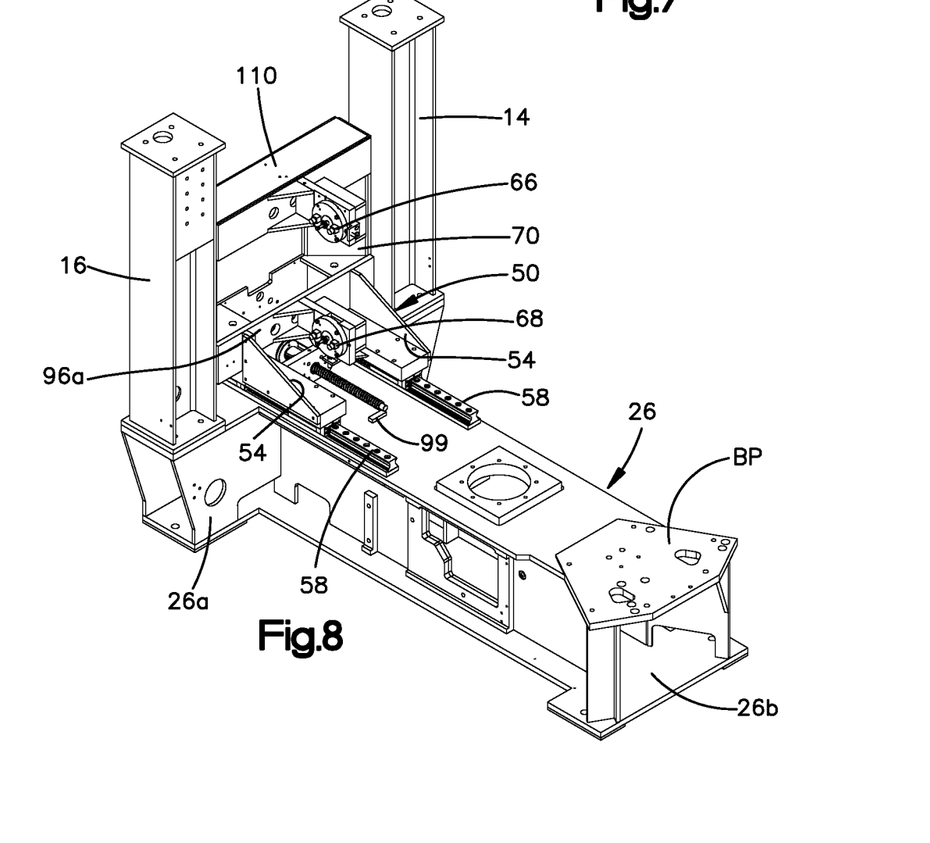
FIG. 8 is a perspective view of a portion of the system showing portions of a frame and a load wheel carriage frame operatively connected to a frame member.

Referring also to FIG. 5 and FIG. 8, the frame mounts a load wheel carriage indicated generally by the reference character 50, which rotatably mounts a load wheel 52. The load wheel may be of conventional construction, such as that shown in U.S. Pat. No. 5,979,231 which is hereby incorporated by reference. Referring in particular to FIG. 8, the load wheel carriage comprises a slidably movable carriage frame 50a (see FIG. 13). The carriage frame 50a includes a pair of spaced apart side supports 54 which include bearing blocks 60 that slidably engage a pair of linear bearing rails 58. The side supports 54 include horizontal mounting blocks 54a, which rigidly mount the bearing blocks 60 (see FIGS. 5 and 7) that engage the rails 58.

Figure 12:
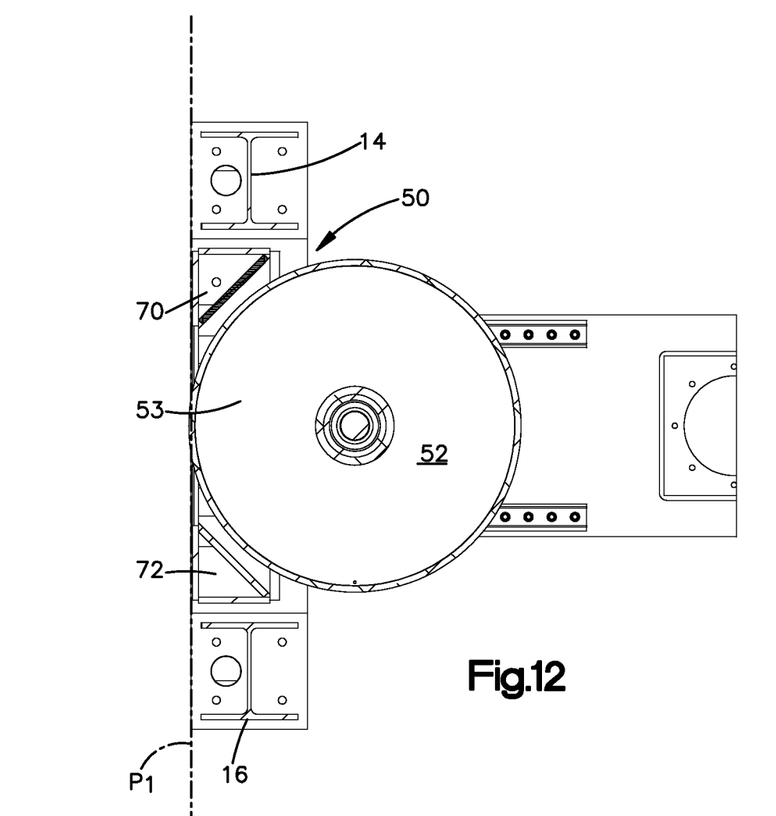
FIG. 12 is a view of a portion of the tire uniformity testing system as seen from the plane indicated by the line 12-12 in FIG. 7.

The carriage 50 also includes upper and lower load cell and load cell mountings 66, 68 (see FIGS. 7 and 8) which rotatably support the load wheel 52. The load wheel carriage 50 includes a pair of uprights 70, 72 which, in the preferred embodiment, are triangular in shape and are best shown in FIGS. 12 and 17. With the disclosed construction, the shape of the uprights surround a portion of the load wheel 52 and reduce the overall transverse dimension of the load wheel and carriage, as compared to the load wheel carriage shown in U.S. Pat. No. 5,979,231. In the preferred and illustrated embodiment, a hypotenuse of each triangle upright controls the rolling surface 52a for the load wheel. In effect, an outer portion 53 of the load wheel is nested between the uprights 70, 72 (shown best in FIG. 12). As a result, and as best shown in FIG. 17, the overall footprint of the tire uniformity machine/system is substantially reduced. With the disclosed construction, the load wheel 52, when retracted, substantially can define the rearmost plane of the machine. In the preferred embodiment, the back of the load wheel, when retracted, and the back of the vertical columns 14, 16 are substantially in the same plane. (seen best in FIG. 17).

As seen in FIG. 17, the wheel spindle 36b mounted to the base 26 is operatively connected to a drive motor 76 by an associated drive belt 76a. An encoder 78 (only partially shown) is also operatively connected to the output of the drive motor 76 by an associated belt 78a and monitors the rotative position of a tire being tested.

The load wheel carriage 50 (which carries the load wheel 52) moves toward and away from a tire held by the upper and lower chuck portions 36a, 36b. Referring in particular to FIG. 17, the carriage 50 moves along a line 80 (also designated as centerline CL) that extends through an axis of rotation 82 of the load wheel 52 and an axis of rotation 84 of the lower spindle 36b so that the axis of rotation 82 of the load wheel 52 remains aligned with the axis of rotation 84 of the spindle 36b as the load wheel moves into contact with a tire held by the chuck.

Figure 11:
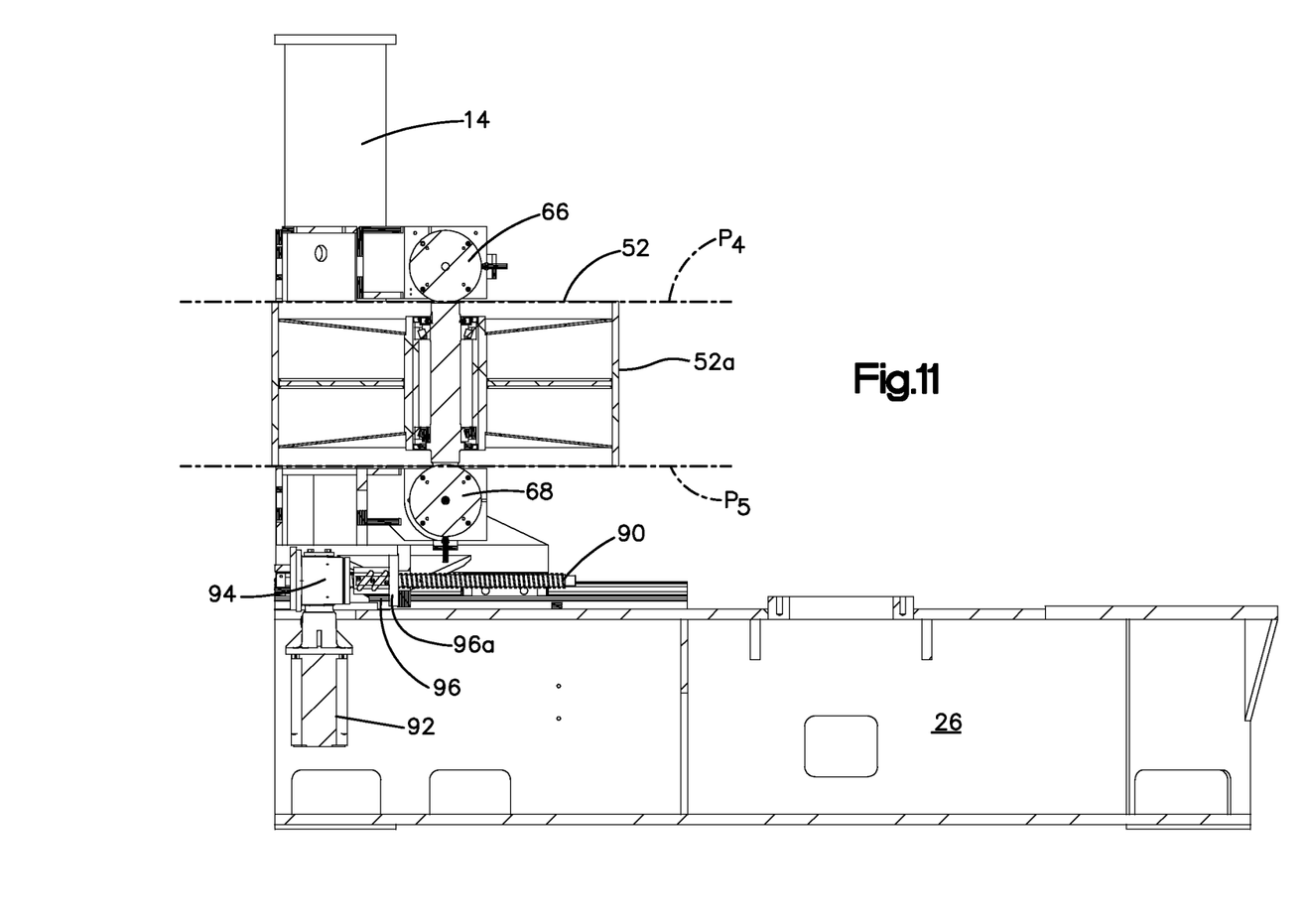
FIG. 11 is a cross-sectional view of the tire testing system as seen from the plane indicated by the line 11-11 in FIG. 5.

Referring also to FIG. 11, movement in the load wheel carriage 50 is achieved using a linear actuator which comprises a rotatable ball screw 90. The ball screw 90 is rotated by a drive motor 92 that depends downwardly from a gear box 94. The ball screw 90 is attached to an output gear (not shown) in the gear box in a conventional way. A ball nut 96 is attached to the load wheel carriage 50 via a transverse drive plate 96a (shown best in FIG. 8). As seen in FIG. 8, rotation of the ball screw 90 produces linear movement of the load wheel carriage 50 along the linear bearing rails 58, the direction of movement being dependent on the direction of rotation of the ball screw 90. The frame base 26 includes a fixed stop 99, which limits the inward movement of the load carriage 50 (shown best in FIG. 8).

The construction of the load carriage 50 and, in particular, the configuration of the carriage drive system substantially reduces the footprint of the disclosed tire uniformity machine/system. Referring to FIG. 11, the load wheel 52 defines upper and lower radial planes $P_4$ and $P_5$) respectively. As seen best in FIG. 11, the carriage drive is located below the load wheel 52, i.e., below the lower plane $P_5$, as compared to prior art designs, such as that shown in U.S. Pat. No. 5,979,231 which illustrates a construction where the carriage drive is mounted to the side and outboard of the load wheel and carriage, thus substantially increasing the footprint of the machine. The present invention contemplates the mounting of the carriage drive above the load wheel, i.e., above the plane $P_4$. The invention also contemplates one or more carriage drives mounted on either side of the load wheel 52 above, below or between the planes $P_4$ and $P_5$. For example, one or more carriage drives can be mounted in line with and/or coupled to the load wheel uprights 70, 72.

Figure 13:
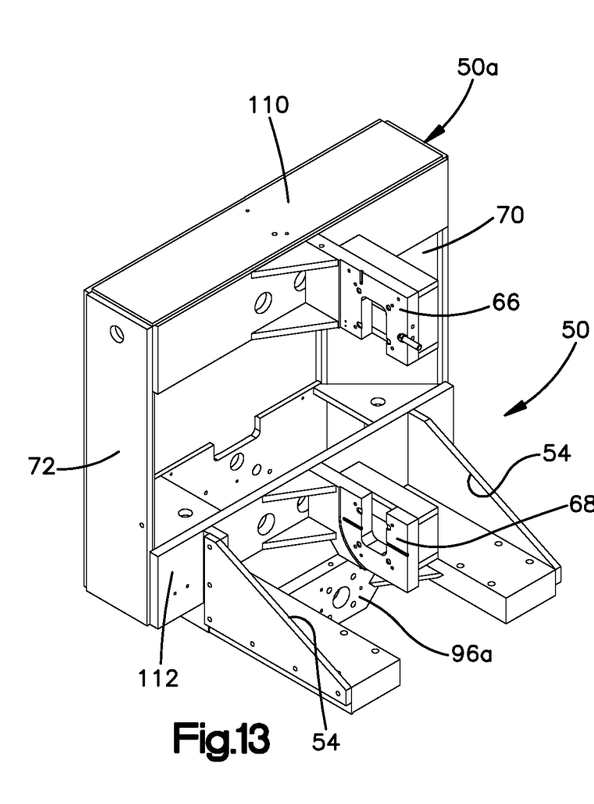
FIG. 13 is perspective view of the load wheel carriage.

With the disclosed construction, however, the application of force by the tire to load wheel during a test cycle tends to urge the upper load cell 66 out of vertical alignment with the lower load cell mounting 68. In the disclosed construction, this is compensated for by utilization of the triangular uprights 70, 72 and rigid cross piece 110 which interconnects the top of the uprights. The carriage frame is best shown in FIG. 13 and, in addition to the upper cross piece 110, also includes a rigid lower cross member 112 which together form a substantially rigid frame that can withstand bending moments generated when the load wheel is urged into operating contact with the tire to be tested. With the disclosed construction, the carriage frame 50 can withstand the bending moment applied by the load wheel 52 during testing, such that the net distortion of the positions of the upper and lower cell mounts 66, 68 are within vertical alignment limits.

The construction of the carriage, as indicated above, substantially reduces the transverse dimension of the load wheel assembly and, as a result, the back of the load wheel 52, substantially can define the rearmost plane of the machine. In the preferred embodiment, the back of the load wheel and the back of the triangular uprights, 70, 72 are substantially in the same plane.

Figure 9:
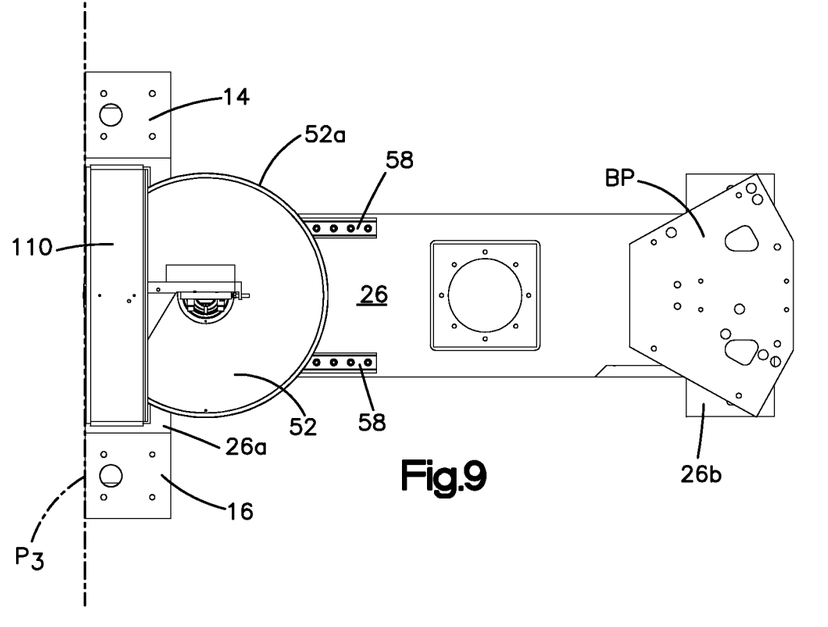
FIG. 9 is a plan view of the system with parts removed to show details of a load carriage assembly and load wheel constructed in accordance with a preferred embodiment of the invention.
Figure 10:
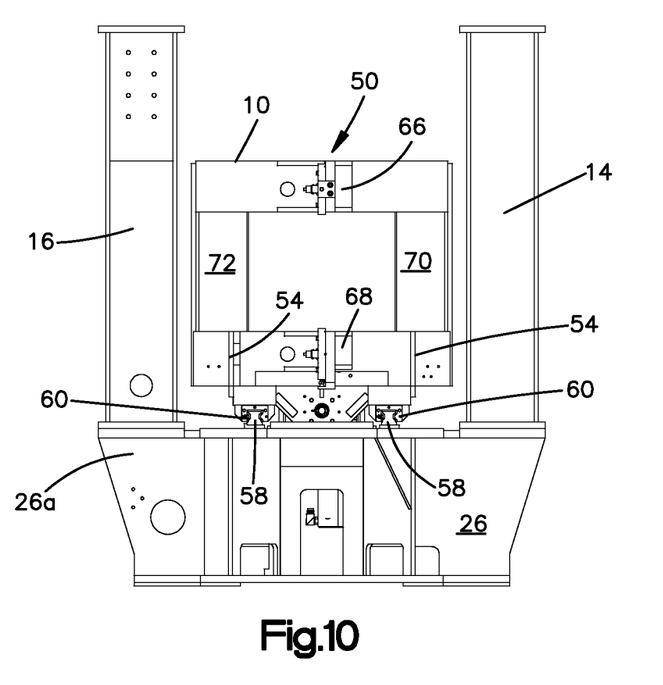
FIG. 10 is a side elevational view showing details of the load wheel carriage.

The relationship between the various components that affect the machine's "footprint" are best illustrated in FIGS. 9, 12 and 17. Referring in particular to FIG. 12, the outermost or left peripheral side (as viewed in FIG. 12) of the base is indicated by the plane designated by the reference character "$P_1$". Referring to FIG. 17, a plane $P_2$ is defined which is tangent to the rolling surface 52a of the load wheel 52 and which is also orthogonal to the center line 80, which, as indicated above, extends through the axis of rotation 82 of the load wheel 52 and the axis of rotation 84 of the lower spindle 36b. As seen best in FIG. 9, in the preferred embodiment, the outermost surface of the load wheel carriage (which comprises the vertical supports 70, 72) and the horizontal cross piece 110 define a plane $P_3$. In the preferred and illustrated embodiment the plane $P_1$ (defined by the upright 14, 16) does not extend to the left, as viewed in FIG. 12, of the plane $P_2$ defined by the load wheel. The plane $P_3$ is preferably coincident with the plane $P_2$ or located slightly to the right of the plane $P_2$ as viewed in FIG. 3. As seen best in FIG. 14, the footprint dimension $F_1$ is minimized to the extent possible, as compared to prior art. The footprint dimension $F_1$ may be considered a transverse dimension or a front to back dimension (or depth) of the machine depending on the positioning of the machine on a factory floor.

Referring also to FIG. 6, the footprint dimension of the machine that is transverse to the dimension $F_1$ is shown and is labeled $F_2$. The footprint dimension $F_2$ is preferably the same or smaller than the dimension $F_2$. In the preferred illustrated embodiment, it is smaller. In many large tire manufacturing facilities, multiple lines of tires, each feeding an associated tire uniformity machine are used. These lines of tires are often positioned side by side in a more or less parallel relationship. Aisles are located between each tire line. The spacing of these adjacent lines of tires are affected by the transverse dimension of the tire uniformity machine, i.e., the $F_1$ dimension. By reducing the $F_1$ dimension of each tire uniformity machine, in a large manufacturing machine, additional lines of tires could be accommodated in a given space, since the space taken up by the adjacent tire uniformity machines is reduced. Accordingly, more machines and associate tire lines can be accommodated. Additionally, by minimizing the $F_1$ dimension, it allows the tire uniformity machine of the present invention to fit within more limited available space. This dimension is minimized by this invention and, as a result, the disclosed tire uniformity machine occupies a much smaller footprint in the manufacturing environment, as compared to prior art machines of this type.

Referring to FIG. 1, the tire uniformity testing system includes features which enable the system to be easily shipped in a shipping container. In particular, and as seen best in FIG. 1, an articulatable pendant arm 120 extends from the side of the machine and mounts a HMI 126. It is preferable that a first arm segment 120a of the pendant 120 be mounted at a elevation above the cross member 30 so that the full range of pendant motion can be accommodated without interference with the top frame member 30. The articulated arm 120 carries a plurality of signal wires (not shown) from the human operated control module 126. To avoid the necessity of requiring disconnection of the pendant arm 120 and associated signal wires from the main frame, the upper end of the pendant arm is attached to a mounting plate 130 which is slidably attached at one end of the upper cross member 30. The vertical dimensions (shown in FIG. 14) between the bottom of the base member 26 and top 30d of the cross member 30 is designed such that the machine can fit within a shipping container. Thus, in order to load the test system/machine 10 into a shipping container, a pressure tank 140 and the upper super structure 34 (which mounts the linear actuator 36) are removed from the cross member 30. The upper end of the pendant arm 120 is mounted to a the plate 130 which includes slots 130a, seen best in FIG. 1. Bolts 132 holding the plate 130 to the end of the upper horizontal frame member 30 are loosened to allow the plate 130 to slide downwardly so that the pendant arm 120 is lowered so that its upper link 120a is below the level established by the top surface 302 of the cross member 30. The pendant arm 120 is then suitably folded against the side of the machine and, thus, allows the testing system to be loaded into a standard shipping container.

FIGS. 8A-18D illustrates an alternate construction for the load wheel carriage 50'. In the alternate construction, the carriage comprises a rigid frame structure 150 that carries a pair of vertically aligned load cell/load wheel mountings 66', 68'. The load cells rotatably mount the load wheel 52. As discussed earlier, the loading of the tire by the load wheel, during a testing cycle, exerts bending moments on the frame tending to misalign the upper and lower load cells 66, 68. In accordance with the construction shown in FIGS. 18A-18D, a pair of parallel links 156 extend between the carriage frame 150 and a rigid cross piece 160. The cross piece 160 mounts a pair of spaced apart bearing blocks (not shown, but the same or similar to the bearing blocks 60, discussed earlier) which slidably engage the linear bearing rails 58 (shown in FIG. 8). The frame 150 (which rotatably holds the load wheel 52) also includes a pair of bearing blocks (not shown, but the same or similar to the bearing blocks 60-FIGS. 2 and 5) which also engage the linear bearing rails 58 so that the frame 150 and rigid cross piece 160 move as assembly along the linear bearing rails 58. The links 156 that extend between the load wheel frame 150 and the cross piece 160 resist the bending moment exerted on the load wheel frame 50 when the load wheel 52 is in contact with the tire during a testing cycle, The links 156 resist the distortion force which would produce misalignment of the upper and lower load cells 66', 68'. The linkage arrangement resists distortions in the carriage 150 outside the allowed limits for accurate testing.

Although the invention has been described with a certain degree of particularity, it should be understood that those skilled in the art can make various changes to it without departing from the spirit or scope of the invention as hereinafter claimed.

The invention claimed is:

1. A tire uniformity testing machine, comprising:
   a) a base;
   b) an upper cross frame member spaced above said base;
   c) a vertical support structure extending upwardly from at least one end of said base for supporting at least one end of said upper cross frame member;
   d) a pair of spaced apart vertical columns extending upwardly from another end of said base;
   e) said base defining a tire testing position at which a tire to be tested is rotatably mounted;
   f) a load wheel carriage at least partially supported by said base and including a rotatable load wheel movable towards and away from said tire testing station, along a transverse line of action;

g) said load wheel defining a rolling surface engageable with a periphery of a tire to be tested, said load wheel and tire rotatable about a pair of parallel, axes, said line of action passing through said axes of rotation;

h) said upwardly extending, spaced apart columns located such that a peripheral portion of said load wheel is located between said supports, said supports defining an outer footprint plane and said rolling surface having a tangent plane that is orthogonal to said line of action and that is not substantially outside said outer footprint plane when said load wheel is in a retracted position.

2. The tire uniformity testing machine of claim 1 wherein said load wheel carriage comprises:
   a) a pair of spaced apart vertical supports and a pair of vertically spaced cross pieces extending between said vertical supports, said pair of cross pieces including an upper cross piece mounting said upper load cell assembly and a lower cross piece mounting a lower load cell assembly, said load cell assemblies rotatably supporting said load wheel;
   b) said vertical supports located on either side of said peripheral portion of said load wheel, such that said peripheral portion of said load wheel is nested between said vertical supports; and,
   c) said carriage further comprising at least one actuator positioned such that said actuator does not extend substantially outside said outer footprint plane defined by said vertical columns when said load wheel is moved towards and away from said tire testing station.

3. The tire uniformity testing machine of claim 2 wherein said spaced apart vertical supports of said load wheel carriage are triangular in cross-section wherein a hypotenuse of said triangle cross section confronts said rolling surface of said load wheel.

4. The tire uniformity testing machine of claim 1 wherein said vertical column structure comprises a pair of adjacent, angled vertical columns.

5. A load wheel carriage assembly, comprising:
   a) a pair of spaced apart vertical supports;
   b) upper and lower, vertically spaced apart cross pieces supported by said vertical supports;
   c) upper and lower load cells mounted to said upper and lower cross pieces, respectively, between which a load wheel is rotatably supported;
   d) said load wheel having a rolling surface which engages a periphery of a tire to be tested when said carriage assembly is moved into a tire testing position;
   e) said load wheel including a portion nested between said vertical columns and an upper radial side of the load wheel located in an upper plane and a lower radial side located in a lower plane;
   f) at least one actuator for moving said carriage towards and away from said tire testing position, said actuator located above or below said upper and lower planes of said load wheel and said actuator not being located between said upper and lower planes.

6. The load wheel carriage assembly of claim 5 wherein said vertical supports are triangular in cross section and a hypotenuse of said triangular cross-section confronts said rolling surface of said load wheel.

7. The tire uniformity testing machine of claim 1 wherein said base, vertical columns and said upper cross frame member are configured such that said machine defines a height dimension that can fit within a standard shipping container.

8. The tire uniformity testing machine of claim 1 wherein said load wheel carriage comprises:
   a) a pair of spaced apart vertical supports and a pair of vertically spaced cross pieces extending between said vertical supports, said pair of cross pieces including an upper cross piece mounting said upper load cell assembly and a lower cross piece mounting a lower load cell assembly, said load cell assemblies rotatably supporting said load wheel;
   b) said vertical supports located on either side of said peripheral portion of said load wheel, such that said peripheral portion of said load wheel is nested between said vertical supports; and,
   c) said carriage further comprising at least one actuator positioned below or above said load wheel for moving said load wheel towards and away from said tire testing station.

9. A load wheel carriage assembly, comprising:
   a) a pair of spaced apart vertical supports;
   b) upper and lower, vertically spaced apart cross pieces supported by said vertical supports;
   c) upper and lower load cells mounted to said upper and lower cross pieces, respectively, between which a load wheel is rotatably supported;
   d) said load wheel having a rolling surface which engages a periphery of a tire to be tested when said carriage assembly is moved into a tire testing position;
   e) said load wheel including a portion nested between said vertical columns and an upper radial side of the load wheel located in an upper plane and a lower radial side located in a lower plane;
   f) at least one actuator for moving said carriage towards and away from said tire testing position, said actuator located and configured such that said actuator does not extend substantially outside an outer footprint plane defined by said vertical supports when said load wheel is moved towards and away from said tire testing station.

10. The tire uniformity testing machine of claim 7 wherein said height dimension is 96 inches or less.

11. The tire uniformity testing machine of claim 1 wherein said base defines a footprint dimension $F_1$ that is larger than a footprint dimension $F_2$ that is also defined by the base and is transverse to the footprint dimension $F_1$.

12. The load wheel carriage assembly of claim 5, wherein said carriage assembly engages a track way mounted to said base, said track way supporting linear motion of said carriage towards and away from said tire testing position and said load wheel carriage assembly includes a linkage arrangement coupling said spaced apart vertical supports to said track way, whereby a bending moment in said vertical supports generated during a tire testing cycle is resisted by said linkage.

* * * * *